United States Patent [19]
Hendricks

[11] Patent Number: 5,826,345
[45] Date of Patent: Oct. 27, 1998

[54] SUSCEPTOR LEVELING AID

[75] Inventor: Craig G. Hendricks, Sublimity, Oreg.

[73] Assignee: Hewlett-Packard Company, Palo Alto, Calif.

[21] Appl. No.: 643,425

[22] Filed: May 9, 1996

[51] Int. Cl.⁶ ................................................. G01C 9/02
[52] U.S. Cl. ............................................. 33/365; 33/833
[58] Field of Search ............................. 35/365, 370, 371, 35/374, 375, 533, 832, 833, 792

[56] References Cited

U.S. PATENT DOCUMENTS

| | | | |
|---|---|---|---|
| 2,752,692 | 7/1956 | Smith | 33/374 |
| 3,051,425 | 8/1962 | Homrighausen | 33/375 |
| 4,693,012 | 9/1987 | Cesna | 33/533 |
| 4,916,824 | 4/1990 | Shimazutsu et al. | 33/533 |
| 5,575,073 | 11/1996 | Von Wedemayer | 33/370 |

*Primary Examiner*—G. Bradley Bennett

[57] ABSTRACT

A susceptor situated within an IC circuit fabrication machine has its level and height calibrated using a levelling apparatus which stands on three legs and includes a plurality of suspended level detectors. The susceptor is positioned between the legs under each one of the level detectors. Before susceptor calibration, the levelling apparatus first is calibrated to a known flat surface. The apparatus then is placed within the fabrication machine and the susceptor is moved to a first position. Distal sensing points of each detector are placed in contact with the susceptor surface. Respective level adjustment mechanisms (e.g., screws) of the fabrication machine then are turned to bring adjust the orientation of the susceptor and bring each level detector to a common level indication. The levelling apparatus includes four level detectors aligned along two axes. Once level, the susceptor is raised until level detectors indicate a common desired process position height.

20 Claims, 6 Drawing Sheets

SUSCEPTOR LEVELING AID

BACKGROUND OF THE INVENTION

This invention relates generally to integrated circuit processing machines, and more particularly, to a levelling apparatus for calibrating level of a susceptor within an integrated circuit processing machine.

Integrated circuits are mass produced by fabricating hundreds of identical circuit patterns on a single semiconductor wafer. Within an integrated circuit thousands of devices (e.g., transistors, diodes) are formed. These devices are formed by various fabrication processes, including doping processes, deposition processes, etching processes and other processes. During fabrication the wafer goes through various process stages to fabricate the on-chip integrated circuit devices. Eventually, the wafer is "sawed" into multiple integrated circuit ("IC") chips.

During many fabrication process stages, the wafer is placed on a susceptor within a chamber. Exemplary fabrication machines include an ion implantation system having an ion implantation chamber, a chemical vapor deposition system having a deposition chamber, and an etching system having an etching chamber. Ions are implanted, for example, to dope a wafer region. Materials are deposited via chemical vapor deposition and physical vapor deposition to grow a layer in a prescribed wafer region. Trenches and other geometries are etched out on a wafer to allow material deposition for wiring lines, interconnects, contacts and other conductive, semiconductive and insulator regions. During deposition processes, layers of thin thickness (e.g., 50–6000 Å) are deposited. During etching processes line and line spacing geometries of, for example, less than 0.5 microns are etched.

To fabricate integrated circuits to such precise geometries, it is necessary that the position and orientation of the wafer be precisely controlled. The susceptor supports the wafer and typically, defines the wafer position and orientation. Thus, the susceptor needs to be precisely positioned and controlled. Accordingly, it is important to maintain accurate alignment of a machine's susceptor.

Susceptor alignment can be a tedious maintenance procedure for fabrication systems. The precise calibration requires concentration and patience on the part of maintenance personnel. Because alignment conventionally is set at various points of the susceptor, adjustments at one point can offset calibrations previously performed at another point. Frustration can be a significant problem as repetitive steps are undergone to align the susceptor. As a result, there is a need for a simple, efficient and effective way of aligning a susceptor.

SUMMARY OF THE INVENTION

According to the invention, a leveling apparatus and method is defined for aligning a susceptor situated within an IC circuit fabrication machine. The leveling apparatus is a mechanical device sensing a relative level at each of multiple reference points.

According to one aspect of the invention, the leveling apparatus stands on three legs and includes a plurality of level detectors. The susceptor to be leveled is positioned between the legs under each one of the level detectors. The susceptor contacts level detectors at a distal sensing point of each level detector. Each distal sensing point is movable along a vertical axis. A respective indicator associated with a given level detector indicates a level of the distal sensing point along such vertical axis.

According to a method embodiment for leveling a susceptor, at one step the levelling apparatus itself is first calibrated to a known flat surface. The levelling apparatus is placed with its three legs resting on the known flat surface. The plurality of level detectors then are zeroed or otherwise set to a common level indication. For example, the distal sensing point of each level detector is moved into contact with the known flat surface. The level indicators then are zeroed to a common indication. Displacement of any distal contact point along the vertical axis will now cause a change in level indication.

At another step the levelling apparatus is placed within an IC fabrication machine chamber. The levelling apparatus is placed over the machine's susceptor with the apparatus legs resting on a first surface (e.g., base surface or ledge) within the chamber. The susceptor is to be calibrated to achieve a level orientation relative to the first surface. The susceptor is moved to its "zero" position and situated under the respective level detectors. Each distal sensing point then is placed in contact with the susceptor. Respective calibration level adjustment mechanisms (e.g., screws) of the susceptor then are turned to adjust the orientation of the susceptor. As the orientation changes, level indications sensed by the level detectors change. The calibration adjustment mechanisms are manipulated to cause each level indication sensed by the plurality of level detectors to be the same (within a given tolerance). With the adjusted levelling apparatus resting on the first surface, the susceptor now defines a "level" orientation parallel to a plane of the first surface. The calibration level adjustment mechanisms then are locked to avoid further adjustment.

According to another aspect of the invention, the levelling apparatus includes four level indicators (and four corresponding distal sensing points) which define two sensing axes. Two distal sensing points define a first sensing axis. The remaining two distal sensing points define a second sensing axis orthogonal to the first axis. During the step of placing the levelling apparatus within the IC fabrication machine chamber, the respective first and second sensing axes are aligned with respective first and second axes of susceptor adjustment. As the calibration level adjustment mechanisms for one adjustment axis are manipulated, the resulting movement of the susceptor orientation causes movement of the distal sensing points which are in contact with the susceptor, but not on such axis. As the calibration level adjustment mechanisms for the other adjustment axis are manipulated, the resulting movement of the susceptor orientation causes movement of the distal sensing points which are in contact with the susceptor, but not on such axis. As a result, level adjustment and level sensing along one axis is substantially independent of level adjustment and level sensing along the other axis.

One advantage of the invention is that by defining level sensing axes which align to susceptor level adjustment axes, the levelling operation is simplified. In particular, the need for iterative steps to bring the susceptor into a level position is avoided because adjusting level along one axis is independent of the alignment sensing along an orthogonal axis. Another advantage of the invention is the low cost structure of the levelling apparatus. By forming a levelling apparatus having four level detectors suspended on three legs, an effective levelling apparatus is achieved. A susceptor situated in contact with levelling apparatus distal sensing points is levelled relative to any flat reference surface upon which the levelling apparatus is positioned. For IC fabrication machine chambers having a flat base surface or ledge, the machine's susceptor is effectively levelled to a select one of such surfaces. These and other aspects and advantages of the invention will be better understood by reference to the following detailed description taken in conjunction with the accompanying drawings.

DESCRIPTION OF SPECIFIC EMBODIMENTS

Levelling Apparatus

Figure 1:
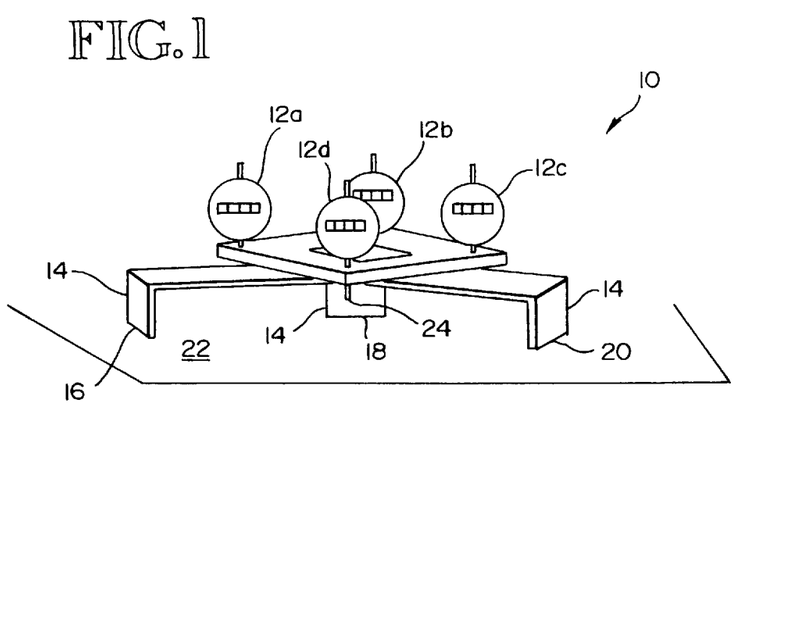
FIG. 1 is a perspective view of a levelling apparatus according to an embodiment of this invention.
Figure 2:
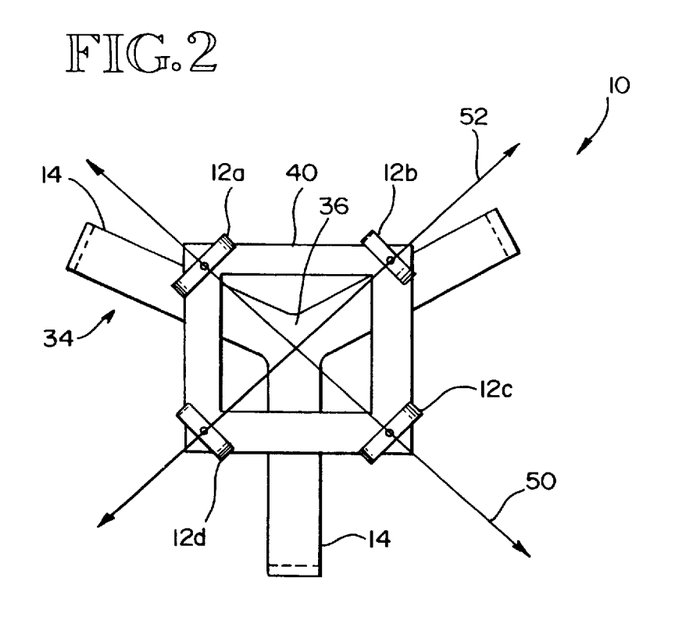
FIG. 2 is a planar view of the levelling apparatus of FIG. 1.
Figure 3:
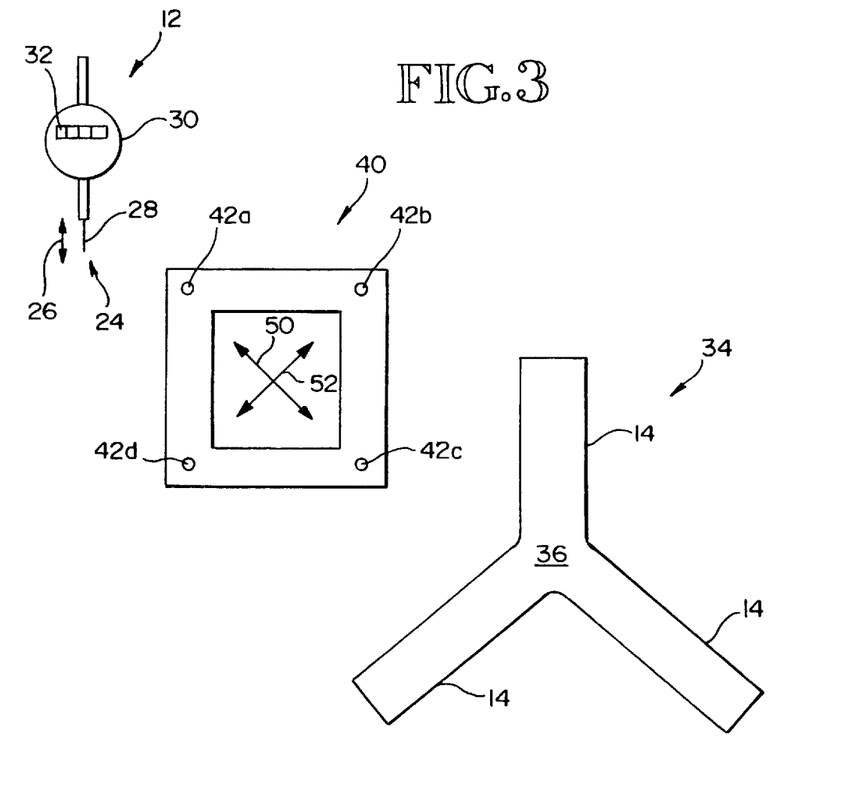
FIG. 3 is a partial exploded view of the levelling apparatus of FIG. 1.

FIGS. 1–3 show a levelling apparatus 10 according to an embodiment of this invention. The levelling apparatus 10 is for sensing the level of a susceptor or other generally flat object in physical contact with each of a plurality of level detectors 12 relative to a support surface 22. The levelling apparatus 10 includes a plurality of legs 14 which support the level detectors 12. In one embodiment three legs are included. Each leg defines a respective primary contact point 16, 18, 20 with a support surface 22 upon which the levelling apparatus 10 rests. The support surface 22 is any surface relative to which a level is to be measured. Preferably the support surface 22 used during a levelling process is a flat surface.

Each level detector 12 has a distal sensing point 24 (see FIGS. 1 and 3) at which level is detected. Each distal sensing point 24 is oriented downward toward and generally perpendicular to the support surface 22. Also, each distal sensing point 24 is free to move in a vertical direction along a prescribed axis 26 (see FIG. 3) generally perpendicular to the support surface 22. In one embodiment each level detector 12 has a distal sensing point 24 having a 2.5 centimeter vertical range of motion. Each respective distal sensing point 24 is part of an arm 28 that moves up and down within a housing 30 of a level detector 12. In a preferred embodiment, the range of motion of each distal sensing point 24 extends to include a point at the support surface 22. In one embodiment each level detector 12 is a digimatic indicator IDC series 543 manufactured by Mitutoyo Corporation of Tokyo, Japan. Each level detector 12 is mounted or otherwise attached to the levelling apparatus 10. In the illustrated embodiment each level detector includes a level indicator 32. In other embodiments, a level indicator is located remote from the level detector and/or coupled to a digital computing device (not shown).

According to one construction of the levelling apparatus 10, three legs 14 define an integrated leg structure 34 (see FIG. 3). Each leg 14 extends from a common vertex or other area 36. In a preferred embodiment each leg 14 extends radially outward in a direction generally parallel to a plane defined by the support surface 22 (see FIGS. 1–3). The legs 14 then bend downward toward the support surface 22 (see FIG. 1). In another embodiment each leg 14 extends downward from an upper connecting structure toward the support surface 22. In alternative embodiments, the legs need not define an integrated leg structure, but instead define components attached together. Such attachment is either permanent or separable. To enable precise, reliable, repeatable level measurement, however, it is preferable that the leg structure, integral or otherwise, be a rigid structure with minimal play. Rigidity with minimal play is desired to maintain the level detectors 12 at a fixed position relative to distal ends 16, 18, 20 of the legs 14. Such fixed positioning avoids moving the level detectors 12 out of calibration and limits distal sensing point 24 motion to be along a vertical axis 26. Each vertical axis for the respective level detectors 12, therefore, is maintained in parallel relative to each other and perpendicular relative to the support surface 22.

Mounted, otherwise attached, or integrally formed with the leg structure 34 is a support platform 40. The platform 40 defines an opening 42 for each level detector 12. In a preferred embodiment, each level detector 12 is secured into a corresponding opening 42 to prevent movement or play of the level detector 12 relative to the platform 40 and leg structure 34. In various embodiments each level detector 12 is removably secured or fixedly secured to the platform 40.

In one embodiment the levelling apparatus 10 includes four levelling detectors 12a–12d. Each levelling detector is secured into a corresponding opening 42a–42d. Two levelling detectors 12a, 12c are secured within openings 42a, 42c and define a first level sensing axis 50, while the other two level detectors 12b, 12d are secured within openings 42b, 42d and define a second level sensing axis 52.

In an alternative embodiment the levelling apparatus includes the levelling detectors 12 mounted to a support platform 40 without a leg structure (e.g., 14). In such embodiment the support platform 40 rests directly on a ledge or upper surface of an IC fabrication machine chamber. Each distal sensing point 24 extends downward from level detector housing 30 beneath the level of the ledge. The susceptor level and orientation then are calibrated relative to the ledge. In yet another embodiment the support platform 40 includes one or more contact points (e.g., 16, 18, 20) placed into physical communication with a chamber ledge or other support surface.

IC Fabrication Machine with Susceptor

In fabricating integrated circuits on a wafer, the wafer typically is suspended on a susceptor. A susceptor is an adjustable support surface for receiving a wafer or other object. The orientation and in some embodiments position of the susceptor is adjustable. For an ion implantation machine a susceptor supports one or more wafers at a known position and orientation while the wafers are doped. For a deposition machine, a susceptor supports a wafer while a layer of material (e.g., conductor, semiconductor or insulator) is deposited over a region of the wafer. For an etching system a wafer is supported at a known position and orientation while material is etched away. In each of these applications it is important that the wafer be maintained at some known position and some known orientation. For example, in depositing a layer of material it is desirable that the deposited layer be of uniform thickness. To achieve a uniform thickness it is important that the wafer be at a level orientation relative to a deposition sputtering target or a vapor emission nozzle. Accordingly, the susceptor is to be calibrated to obtain such a level orientation.

Figure 4:
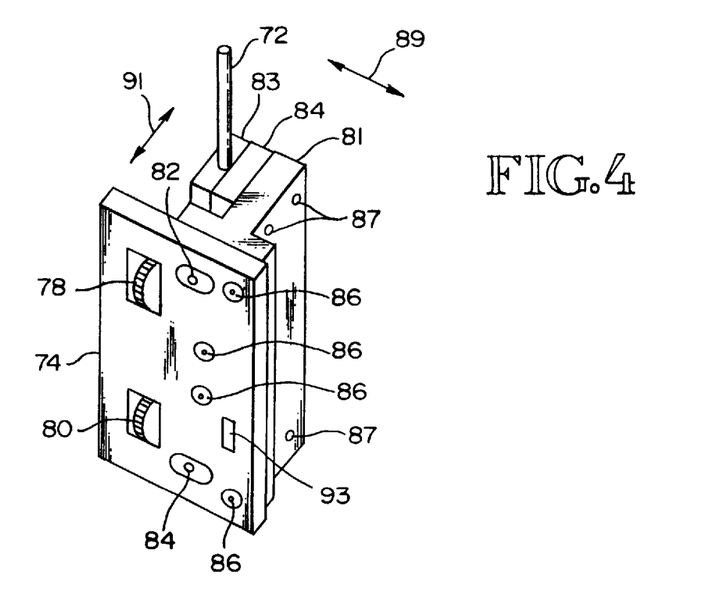
FIG. 4 is a partial perspective view of an IC fabrication machine.

FIG. 4 shows an exemplary susceptor 60 for a chemical vapor deposition machine 62. The susceptor is located within a deposition chamber 64. The susceptor 60 supports a wafer to maintain the wafer within a flat plane. In one embodiment the susceptor 60 has a flat upper surface 66 upon which a wafer is received. In various embodiments zero or more openings are defined in the upper surface 66. The susceptor 60 is supported within the machine chamber 64 by a rigid isolation arm 68. The arm 68 is attached to a lift bellows 70. A rigid rod 72 extends within the bellows 70 from a susceptor position mechanism 74. The position control mechanism 74 includes a motor (not shown) for adjusting the height and position of the susceptor 60. Height is adjusted by driving the lift bellows to move the isolation arm 68 and susceptor 60 along a vertical axis 76.

The position control mechanism 74 includes level adjustments mechanisms 78, 80, 82, 84 for defining the orientation of the susceptor 60 and a height adjustment switch 93 for altering susceptor 60 height. Two thumbscrews 78, 80 are included for adjusting side to side orientation of the susceptor. Two turn screws (e.g., alien screws) 82, 84 are included for adjusting front to back orientation of the susceptor 60. Although mechanical turning devices are used in the illustrated embodiment to perform the orientation adjustments, other mechanisms include electrically driven electromechanical devices, gear devices, belt-driven devices, and pneumatic/hydraulic lever arms, any of which may be computer-driven or separately controlled. Such level adjustment mechanisms typically are used to calibrate a susceptor to a level orientation. Locknuts 86, 87 or other locking devices are used to lock the level adjustment mechanisms 78, 80, 82, 84 at a given position once set.

Figure 5:
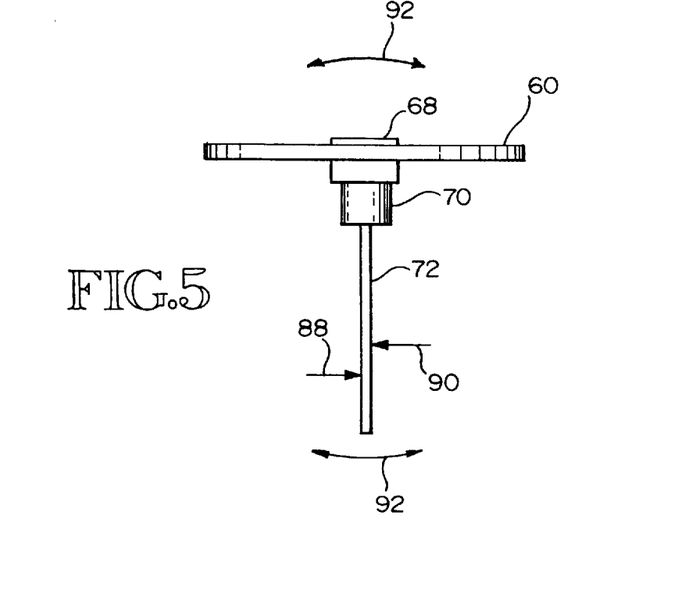
FIG. 5 is a front view diagram of a susceptor and support assembly of the machine of FIG. 4.
Figure 6:
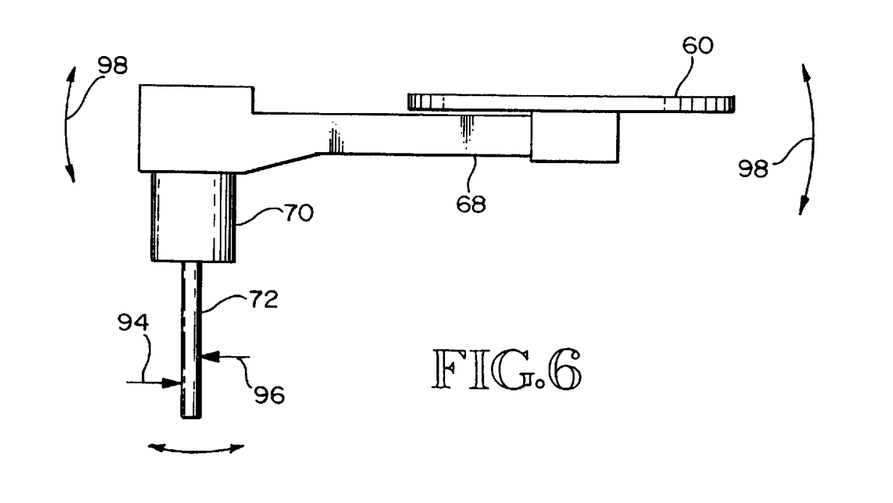
FIG. 6 is a side view diagram of the susceptor and support assembly of the machine of FIG. 4.

To adjust the susceptor orientation, the adjustment mechanisms alter the orientation of the rod 72. FIG. 5 shows the susceptor 60 and rod 72 rotation motion 92 for side to side adjustment. In one embodiment, the thumbscrews 78, 80 exert forces on a block 81 moving the block along an axis 89. The block 81 exerts forces 88, 90 which rotate the rod 72 along an angular direction 92. The susceptor 60, arm 68 and rod 72 define a rigid assembly. Thus, the forces 88, 90 also translate the susceptor 60 in the angular direction 92 about an axis 85 (see FIGS. 4–5). FIG. 6 shows the susceptor 60 and rod 72 rotation motion 92 for front to back adjustment. In one embodiment, the set screws 82, 84 exert forces on blocks 83 and 84 moving the block along an axis 91. The blocks 83, 85 exert forces 94, 96 which rotate the rod 72 along an angular direction 98. Because the susceptor 60, arm 68 and rod 72 define a rigid assembly, the forces 94, 96 also translate the susceptor 60 in the angular direction 98 about an axis 81 (see FIGS. 4 and 6). Once the orientation of the susceptor 60 is calibrated, the block 81 is locked in position by locknuts 86 and the blocks 83, 85 are locked in position by locknuts 87.

Levelling Method

Before using the levelling apparatus 10 to measure or adjust the level of an object, the levelling apparatus 10 itself is to be calibrated. To do so, the levelling apparatus is placed on a known flat surface 100. In one embodiment a granite block is ground to have a precise flat upper surface 100. Other types of surfaces also may be used. Granite is described in the exemplary embodiment because of its hardness and its ability to maintain a precise flat surface over time.

Figure 7:
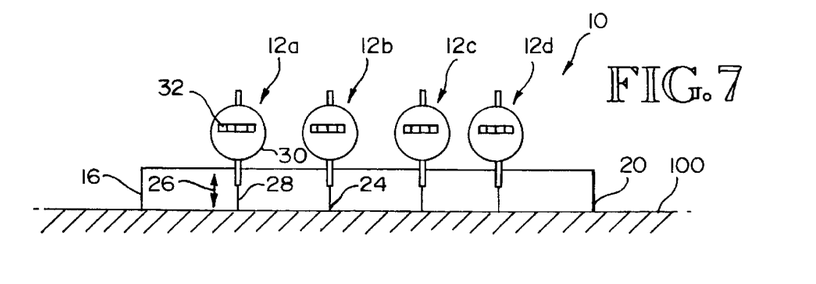
FIG. 7 shows the levelling apparatus of FIG. 1 undergoing calibration according to an embodiment of this invention.

The levelling apparatus 10 is placed on surface 100 so that a distal end 16, 18, 20 of each leg 14 rests on the flat surface 100. The arm 28 of each level detector 12 then is moved by an operator to bring each distal sensing point 24 into contact with the flat surface 100. While contact is maintained the level detectors are reset so that each indicates the same level (e.g., a "zero" level). In one embodiment this is achieved by setting level indicators 32 of each level detector 12 to a reading of "0". Now whenever all the distal sensing points 24 are positioned to cause the level indicators 32 to have the same reading, the distal sensing points 24 define a flat "level" plane parallel to a plane defined by the distal ends 16, 18, 20 of the legs 14. At the zero position the distal sensing points 24 and distal ends of the legs 14 all reside in a common plane. When the level indicators 32 read a common value other than that of the zero position, the distal sensing points 24 define a parallel plane within tolerances determined by the flatness of surface 100, the accuracy of the level detectors 12 and a rigidity tolerance of the levelling apparatus 10. Once calibrated, the levelling apparatus is ready for use to measure the level of an object.

Figure 8:
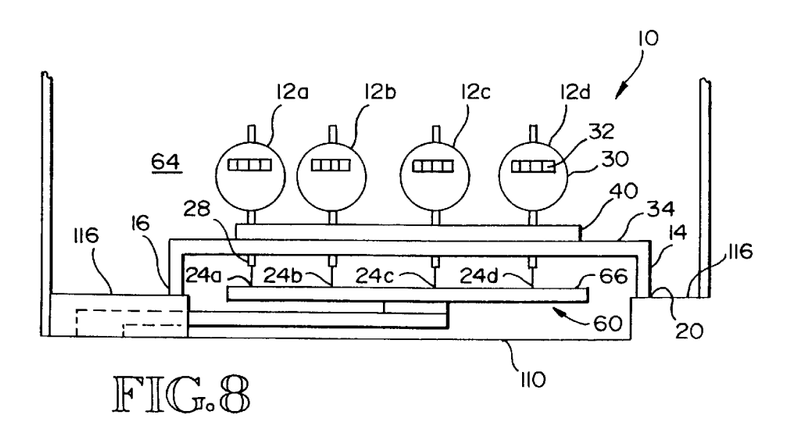
FIG. 8 shows a side planar view of the levelling apparatus of FIG. 1 positioned within a chamber for use in levelling a susceptor according to an embodiment of this invention.

FIG. 8 shows a diagram of the levelling apparatus 10 inserted within the chamber 64 of an IC fabrication machine 62. Prior to insertion, the susceptor 60 is lowered toward a base surface 110 of the chamber 64. Typically such lowering is an automatic process which positions the susceptor at a "zero" position within the chamber 64. In the illustrated embodiment the chamber 64 includes a ledge 116 upon which the levelling apparatus 10 rests. Typically, the base surface 110, the ledge 116 and a chamber lid 120 (see FIG. 10) each define parallel planes. For a chemical vapor deposition system a gas distribution system is suspended from the lid 120. It is desirable to define the susceptor 60 level relative to the lid 120 and gas distribution system. Because the ledge 116 and base surface 110 are parallel with the lid 120 within a given tolerance, the susceptor is levelled to the base surface 110, ledge 116 or lid 120. In preferred embodiments of the levelling apparatus the susceptor 60 is levelled relative to the base surface 110 or ledge 116.

Figure 9:
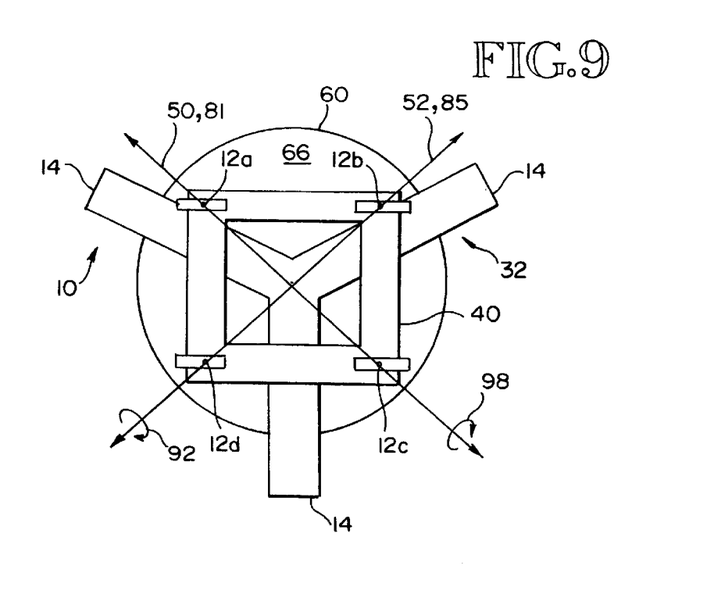
FIG. 9 shows a top planar view of the levelling apparatus of FIG. 1 positioned over the susceptor of FIG. 8.

At the susceptor zero position the height of the upper surface 66 of the susceptor 60 is within the range of motion of the arms 28 of level indicators 12. With the apparatus 10 positioned over the susceptor 60 and at rest upon ledge 116, the arms 28 of each level detector are moved into contact with the susceptor 60 (unless already in such contact). While there is contact between the susceptor 60 and each distal sensing point 24, the level indication of each level detector 12 is read electronically or by an operator. If each level indication is the same within a tolerance determined for a given implementation, then levelling is complete. If, however, the level indications vary then the susceptor orientation is adjusted using the calibration level adjustment mechanisms 78, 80, 82, 84. Thumbscrews 78, 80 are adjusted to alter the side to side orientation of the susceptor 60. Set screw 82, 84 are adjusted to alter the front to back orientation of the susceptor 60. To ease the levelling process, the levelling apparatus is placed within the chamber 64 at a position from which the level detectors 12a, 12c define a first sensing axis 50 corresponding to one of the level adjustment axes 81, 85. FIG. 9 shows the levelling apparatus 10 situated with the first sensing axis 50 aligned to the front to back adjustment axis 81 and the second sensing axis 52, aligned to the side to side adjustment axis 85. As a result, the side to side adjustment in a direction 92 about adjustment axis 85 does not alter the levels indicated by detectors 12b and 12d. Similarly the front to back adjustment in a direction 98 about adjustment axis 81 does not alter the levels indicated by detectors 12a and 12c. By aligning the axes 50, 81 and by aligning the axes 52, 85 level sensing about axis 50 is independent of level sensing about axis 52. A similar result is achieved by aligning axis 50 to axis 85 and axis 52 to axis 81.

Thus, in an embodiment in which the sensing axes 50, 52 and adjusting axes 81, 85 are aligned, the susceptor 60 orientation is readily adjusted to a level orientation as indicated by a common reading at each level indicator 32 of the respective level detectors 12. Side to side adjustment is performed to bring level indicators for detectors 12a and 12c to a common reading by moving the susceptor 60 along a movement 92 about axis 85. Similarly front to back adjustment is performed to bring level indicators for detectors 12b and 12d to a common reading by moving the susceptor 60 along a movement 98 about axis 81. With two opposing level detectors 12a, 12c having a common level indication, the other two level detectors 12b and 12d will achieve a common level indication only when such indication is the same as for detectors 12a and 12c. In other words detectors 12a and 12c indicate at a common level and detectors 12b and 12d concurrently indicate at a common level only when all four detectors 12a–12d are at the same common level.

When the susceptor 60 is adjusted to have each level indicator 32 have a common reading, the susceptor 60 defines a level plane parallel to a reference plane. The reference plane is defined by the ends of the legs 14. As such ends rest on the ledge 116, the ledge 116 is coincident to the reference plane. Thus, the susceptor 60 has a level orientation parallel to the ledge 116. As the ledge is parallel with the chamber lid 120, the susceptor 60 also is level with respect to the chamber lid 120. For an embodiment in which the levelling apparatus 10 rest on the base surface 110, the base surface 110 is coincident to the reference plane and the susceptor is levelled in parallel to the base surface 110.

Susceptor Height Adjustment

In addition to calibrating the susceptor 60 level, a "process" position (i.e., height) also is to be calibrated. The specific process position height is determined by the specific fabrication process to be run on a wafer or batch of wafers. Typically, a first height position is set during calibration (e.g., a calibrated process position). Subsequently during production, an operator adjusts the susceptor height to a precise process position. The precise process position preferably is within a window about the calibrated process position. The operator is able to set a precise process position within the window, then store the precise process position for a given process for subsequent automatic recall. Such stored position is referred to as a qualified position. An operator uses the qualified position for processing wafers over time so that similar fabrication process results are achieved for each wafer.

Figure 10:
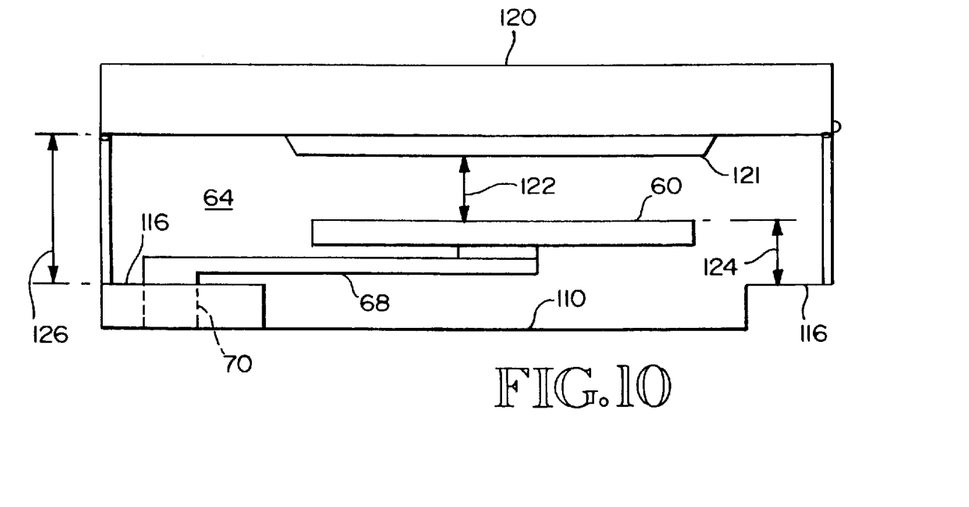
FIG. 10 shows a planar side cut-away view of a conventional fabrication process system.

Referring to FIG. 10, the process height typically is defined relative to a chamber lid 120 or process subsystem components 121 suspended from the chamber lid 120 (e.g., gas distribution system; ion source). Conventional methods for setting the process position require that the position be calibrated under vacuum conditions. According to an embodiment of this invention, however, the levelling apparatus 10 is used to set the calibrated process height under atmospheric pressure conditions, with the chamber lid 120 in an open position. In embodiments in which the levelling apparatus 10 fits within chamber 64 with the chamber lid closed, the height calibration process is performed with the lid in either one of the open or closed positions. In the closed position, the calibration process is performed under atmospheric or reduced (e.g., vacuum) pressures.

To calibrate process height, the levelling apparatus is set on the ledge 116 within the chamber 64 as described above. Once the susceptor has been levelled, the susceptor 60 is raised in incremental steps using the stepping motor of the position control system 74. Because the susceptor 60 is level, each level indicator 32 reads a common value as the susceptor 60 is raised. The common value changes as the susceptor 60 rises. In a preferred embodiment each level indicator 32 displays a height index. For a method in which the levelling apparatus is first calibrated to read a zero height at a "zero" plane defined by distal ends of leg 14, the common reading is a height index relative to such zero plane. In one embodiment, the level indicators 32 display height in either metric or english units. In one embodiment the indicators 32 are accurate to 0.0005 inches.

Figure 11:
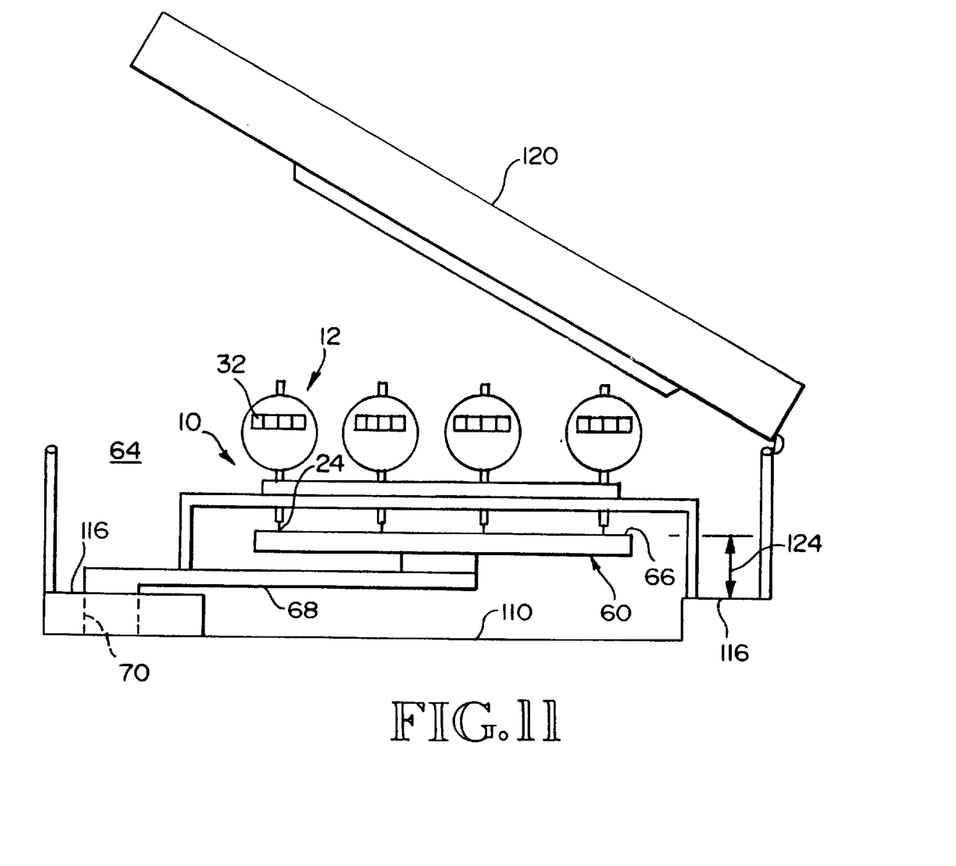
FIG. 11 shows a planar side cut-away view of the system of FIG. 10 with the levelling apparatus of FIG. 1 inserted for calibrating process height according to a method embodiment of this invention.

With the precise height between the ledge 116 and the chamber lid 120 under operating conditions (e.g., vacuum pressure) known, the desired susceptor process position can be defined relative to the ledge 116 rather than to the chamber lid 120. For example, in one embodiment a calibrated process position 122 of 330 MILs below the chamber lid 120 is desired during operation. According to a method embodiment of this invention, such position is set by determining the corresponding height 124 from the ledge 116 rather than from the lid 120. This is done by subtracting the 330 MIL value from the known distance 126 between the ledge 116 and lid 120 (at vacuum conditions). Such derived height is the desired height 124. Referring to FIG. 11, with the levelling apparatus 10 in place and the susceptor 60 beneath the level detectors 12 as for the levelling process described above, the susceptor 60 is stepped upward until the level indicators 32 display a common value corresponding to the desired height 124. Because the position of the levelling apparatus 10 relative to the ledge 116 is the same regardless of the chamber 64 conditions, such stepping operation can be performed under atmospheric pressure or under operating conditions (e.g., vacuum pressure). In a preferred embodiment, the desired height 124 is set under atmospheric conditions. With the susceptor 60 raised to the desired height 124, such position is stored as the calibrated process position. The inventive method therefore results in the calibrated process position being set to the same position as when performing the conventional method. However, the method for setting such position is greatly simplified easing the task for maintenance and operating personnel.

Meritorious and Advantageous Effects

By levelling the susceptor 60 relative to a first surface (parallel to the chamber lid 120 and gas distribution system), an even layer is able to be deposited onto a wafer positioned at surface 66 of the susceptor 60. Similarly, for other embodiments, a even etch is achieved along a wafer or an even doping concentration is promoted within a wafer. Such evenness is achieved because a chamber reference surface (e.g., 110, 116) is parallel to a chamber lid 120 at which an ion source, deposition source or etching source is positioned.

One advantage of the invention is that by defining level detector axes which align to susceptor level adjustment axes, the levelling operation is simplified. In particular, the need for iterative steps to bring the susceptor into a level position is avoided because adjusting level along one axis is independent of the alignment along an orthogonal axis. Another advantage of the invention is the low cost structure of the levelling apparatus. By forming a levelling apparatus having four level detectors suspended on three legs, an effective levelling apparatus is achieved. A susceptor situated in contact with levelling apparatus' distal sensing points is levelled relative to any flat reference surface upon which the levelling apparatus is positioned. For IC fabrication machine chambers having as a flat base surface, the machine's susceptor is effectively levelled to such surface.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. An apparatus to be placed on a reference surface for indicating level of a susceptor, the apparatus comprising:

three legs, each leg having a distal end for contacting the reference surface, the legs for supporting the apparatus above the reference surface; and four level detectors elevated by the three legs above the respective distal ends, each one of the four level detectors having a distal sensing point at which level is sensed, each distal sensing point oriented toward the reference surface; and four level indicators, each level indicator for indicating a level sensed by a corresponding level detector;

wherein the susceptor is levelled relative to the reference surface by achieving concurrent contact between the susceptor and each one of the four distal contact points, then adjusting susceptor orientation to cause each level indicator to indicate a common level while the respective distal ends maintain contact with the reference surface.

2. The apparatus of claim 1, in which the distal sensing points defined by the four level detectors are positioned to define two orthogonal sensing axes.

3. The apparatus of claim 1, in which the distal sensing point of each one of the four level detectors is free to move in a direction perpendicular to a reference plane defined by the distal end of each of the respective legs, and wherein each distal sensing point has a range of movement extending to at least the reference plane.

4. The apparatus of claim 1, in which the reference surface is a surface within a chamber of an IC fabrication machine, and in which the susceptor moves vertically along an axis perpendicular to the reference surface, the IC fabrication machine comprising means for adjusting the level of the susceptor.

5. A method for calibrating a susceptor situated within a chamber of an IC fabrication machine, the susceptor for holding a semiconductor wafer, the method comprising the steps of:

calibrating a levelling apparatus to a first flat surface, the levelling apparatus comprising three legs and four level detectors, each one of the three legs defining a distal end upon which the levelling apparatus rests, the four level detectors being supported by the three legs, each one of the four level detectors defining a distal sensing point at which level is detected;

inserting the levelling apparatus within the chamber to have each of the three legs rest on a second surface at the respective distal ends, the respective distal ends defining a reference plane, each of the respective distal sensing points oriented toward the reference plane;

relatively positioning the susceptor and level detectors to bring the distal sensing point of each one of the four level detectors in contact with the susceptor; and adjusting level of the susceptor to bring a respective level indication for each of the level detectors to a common level while the respective distal ends of the three legs maintain contact with the second surface and while the respective distal sensing points of the four level detectors maintain contact with the susceptor.

6. The method of claim 5, in which a first two of the four distal sensing points define a first axis and a second two of the four distal sensing points define a second axis, the first axis orthogonal to the second axis; and in which the IC fabrication machine defines a first susceptor level adjustment axis and a second susceptor level adjustment axis, the first susceptor level adjustment axis orthogonal to the second susceptor level adjustment axis; and wherein the step of inserting comprises aligning the first axis defined by the first two distal sensing points with the first susceptor level adjustment axis and aligning the second axis defined by the second two distal sensing points with the second susceptor level adjustment axis to prevent level susceptor adjustment along the first susceptor level adjustment axis from disturbing level adjustments sensed at the second axis defined by the second two distal sensing points.

7. The method of claim 5, further comprising the step of calibrating a process position height of the susceptor under atmospheric pressure with the levelling apparatus inserted in the chamber, said calibrating step comprising raising the susceptor to a desired height in which each level detector displays a value.

8. An apparatus to be placed on a reference surface for calibrating susceptor position relative to the reference surface, the apparatus consisting of:

three legs, each leg having a distal end for contacting the reference surface, the legs for supporting the apparatus above the reference surface; and four level detectors elevated by the three legs above the respective distal ends, each one of the four level detectors having a distal sensing point at which level is sensed, each distal sensing point oriented toward the reference surface; and four level indicators, each level indicator for indicating a level sensed by a corresponding level detector; and wherein the susceptor is levelled relative to the reference surface by achieving concurrent contact between the susceptor and each one of the four distal contact points, then adjusting susceptor orientation to cause each level indicator to indicate a common first level while the respective distal ends maintain contact with the reference surface.

9. The apparatus of claim 8, wherein height of the susceptor is calibrated relative to the reference surface at atmospheric pressure by raising the susceptor to a desired height, each level indicator displaying a common value.

10. The apparatus of claim 7, in which the distal sensing points defined by the four level detectors are positioned to define two orthogonal sensing axes.

11. The apparatus of claim 7, in which the distal sensing point of each one of the four level detectors is free to move in a direction perpendicular to a reference plane defined by the distal end of each of the respective legs, and wherein each distal sensing point has a range of movement extending to at least the reference plane.

12. An apparatus to be placed on a reference surface for indicating level of a susceptor, the apparatus comprising:

a plurality of contact points for contacting the reference surface and for supporting the apparatus above the reference surface;

four level detectors, each one of the four level detectors having a distal sensing point at which level is sensed; and four level indicators, each level indicator for indicating a level sensed by a corresponding level detector;

wherein the susceptor is levelled relative to the reference surface by achieving concurrent contact between the susceptor and the plurality of distal sensing points, then adjusting susceptor orientation to cause each level indicator to indicate a common level.

13. The apparatus of claim 12, further comprising a support for the level detectors, the support defining the plurality of contact points.

14. The apparatus of claim 12, in which the distal sensing points defined by the four level detectors are positioned to define two orthogonal sensing axes.

15. The apparatus of claim 12, in which the distal sensing point of each one of the four level detectors is free to move in a direction perpendicular to a reference plane defined by the plurality of contact points.

16. The apparatus of claim 12, in which the reference surface is a surface of an IC fabrication machine, and in which the susceptor moves vertically along an axis perpendicular to the reference surface, the IC fabrication machine comprising means for adjusting the level of the susceptor.

17. A method for calibrating a susceptor situated within a chamber of an IC fabrication machine, the susceptor for holding a semiconductor wafer, the method comprising the steps of:

positioning a levelling apparatus relative to the chamber to have the plurality of contact points rest on a second surface and define a reference plane, the levelling apparatus comprising the plurality of contact points and four level detectors, each one of the four level detectors defining a distal sensing point at which level is detected;

relatively positioning the susceptor and level detectors to bring the distal sensing point of each one of the four level detectors in contact with the susceptor; and adjusting level of the susceptor to bring a respective level indication for each of the level detectors to a common level while the respective contact points maintain contact with the second surface and while the respective distal sensing points of the four level detectors maintain contact with the susceptor.

18. The method of claim 17, further comprising before the step of positioning, the step of calibrating the levelling apparatus to a first flat surface.

19. The method of claim 17, in which a first two of the four distal sensing points define a first axis and a second two of the four distal sensing points define a second axis, the first axis orthogonal to the second axis; and in which the IC fabrication machine defines a first susceptor level adjustment axis and a second susceptor level adjustment axis, the first susceptor level adjustment axis orthogonal to the second susceptor level adjustment axis; and wherein the step of inserting comprises aligning the first axis defined by the first two distal sensing points with the first susceptor level adjustment axis and aligning the second axis defined by the second two distal sensing points with the second susceptor level adjustment axis to prevent level susceptor adjustment along the first susceptor level adjustment axis from disturbing level adjustments sensed at the second axis defined by the second two distal sensing points.

20. The method of claim 17, further comprising the step of calibrating a process position height of the susceptor under atmospheric pressure, said calibrating step comprising raising the susceptor to a desired height in which each level detector displays a value.

* * * * *